(12) United States Patent
VanBlon et al.

(10) Patent No.: US 10,770,060 B2
(45) Date of Patent: Sep. 8, 2020

(54) ADAPTIVELY LEARNING VOCABULARY FOR COMPLETING SPEECH RECOGNITION COMMANDS

(71) Applicant: Lenovo (Singapore) Pte. Ltd., Singapore (SG)

(72) Inventors: Russell Speight VanBlon, Raleigh, NC (US); Jon Wayne Heim, Durham, NC (US); Jonathan Gaither Knox, Morrisville, NC (US); Peter Hamilton Wetsel, Raleigh, NC (US); Suzanne Marion Beaumont, Wake Forest, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 317 days.

(21) Appl. No.: 14/097,878

(22) Filed: Dec. 5, 2013

(65) Prior Publication Data
US 2015/0161984 A1    Jun. 11, 2015

(51) Int. Cl.
*G10L 15/00* (2013.01)
*G10L 15/06* (2013.01)
*G10L 15/22* (2006.01)

(52) U.S. Cl.
CPC ............ *G10L 15/063* (2013.01); *G10L 15/22* (2013.01); *G10L 2015/0638* (2013.01); *G10L 2015/223* (2013.01)

(58) Field of Classification Search
CPC .................................................... G10L 15/00
USPC ....... 704/244, 2, 233, 235, 251, 257, 255, 3; 707/769; 709/204; 715/810
See application file for complete search history.

(56) References Cited

U.S. PATENT DOCUMENTS

| | | | | |
|---|---|---|---|---|
| 8,538,757 | B2 * | 9/2013 | Patch | G10L 15/00 704/257 |
| 2006/0136220 | A1 * | 6/2006 | Gurram | G10L 15/005 704/275 |
| 2006/0156278 | A1 * | 7/2006 | Reager | G06F 9/454 717/104 |
| 2008/0319759 | A1 * | 12/2008 | Da Palma | H04L 67/02 704/270.1 |
| 2009/0125295 | A1 * | 5/2009 | Drewes | H04M 3/42 704/3 |
| 2009/0216525 | A1 * | 8/2009 | Shostak | G06F 40/211 704/9 |
| 2011/0004847 | A1 * | 1/2011 | Herrold | G16H 10/60 715/810 |
| 2011/0066634 | A1 * | 3/2011 | Phillips | G10L 15/22 707/769 |

(Continued)

FOREIGN PATENT DOCUMENTS

CN            201259777 Y      6/2009

*Primary Examiner* — Michael Colucci
(74) *Attorney, Agent, or Firm* — Ference & Associates LLC

(57) ABSTRACT

An embodiment provides a method, including: receiving, via an audio receiver of an information handling device, user voice input; identifying a first word based on the user voice input; accessing a word association data store; selecting an equivalent based on an association with the first word within the word association data store; committing an action based on the equivalent; receiving feedback input from the user regarding the equivalent; and updating the selecting based on the feedback. Other aspects are described and claimed.

17 Claims, 3 Drawing Sheets

(56) References Cited

U.S. PATENT DOCUMENTS

| | | | |
|---|---|---|---|
| 2011/0301955 A1* | 12/2011 | Byrne | G06F 3/167 704/251 |
| 2013/0159413 A1* | 6/2013 | Davis | H04L 63/02 709/204 |
| 2014/0207446 A1* | 7/2014 | Klein | G10L 21/10 704/233 |
| 2014/0229155 A1* | 8/2014 | Leydon | G07F 17/3255 704/2 |
| 2014/0253455 A1* | 9/2014 | Mauro | G06F 16/2457 345/169 |
| 2014/0257807 A1* | 9/2014 | Mauro | G10L 21/06 704/235 |

* cited by examiner

ADAPTIVELY LEARNING VOCABULARY FOR COMPLETING SPEECH RECOGNITION COMMANDS

BACKGROUND

Information handling devices ("devices"), for example laptop computers, tablets, smart phones, desktop computers, smart TVs, kiosks, ATMs, navigation devices, automobile consoles, etc., may be used to process speech inputs, e.g., received by an audio receiver such as a microphone. For example, speech recognition technology enables a device to transform spoken words into machine text, e.g., by converting a digital audio signal to a machine text word, for use in an underlying application, e.g., a word processing document, a search application, etc. Conventional improvements in speech recognition technology have primarily focused on accuracy of the recognition, i.e., accurately identifying the word or words actually spoken by the user.

BRIEF SUMMARY

In summary, one aspect provides a method, comprising: receiving, via an audio receiver of an information handling device, user voice input; identifying a first word based on the user voice input; accessing a word association data store; selecting an equivalent based on an association with the first word within the word association data store; committing an action based on the equivalent; receiving feedback input from the user regarding the equivalent; and updating the selecting based on the feedback.

Another aspect provides an information handling device, comprising: an audio receiver; a processor; and a memory device that stores instructions executable by the processor to: receive, via the audio receiver, user voice input; identify a first word based on the user voice input; access a word association data store; select an equivalent based on an association with the first word within the word association data store; commit an action based on the equivalent; receive feedback input from the user regarding the equivalent; and update the selecting based on the feedback.

Another aspect provides a product, comprising: a storage device having code stored therewith, the code comprising: code that receives, via an audio receiver of an information handling device, user voice input; code that identifies a first word based on the user voice input; code that accesses a word association data store; code that selects an equivalent based on an association with the first word within the word association data store; code that commits an action based on the equivalent; code that receives feedback input from the user regarding the equivalent; and code that updates the selecting based on the feedback.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
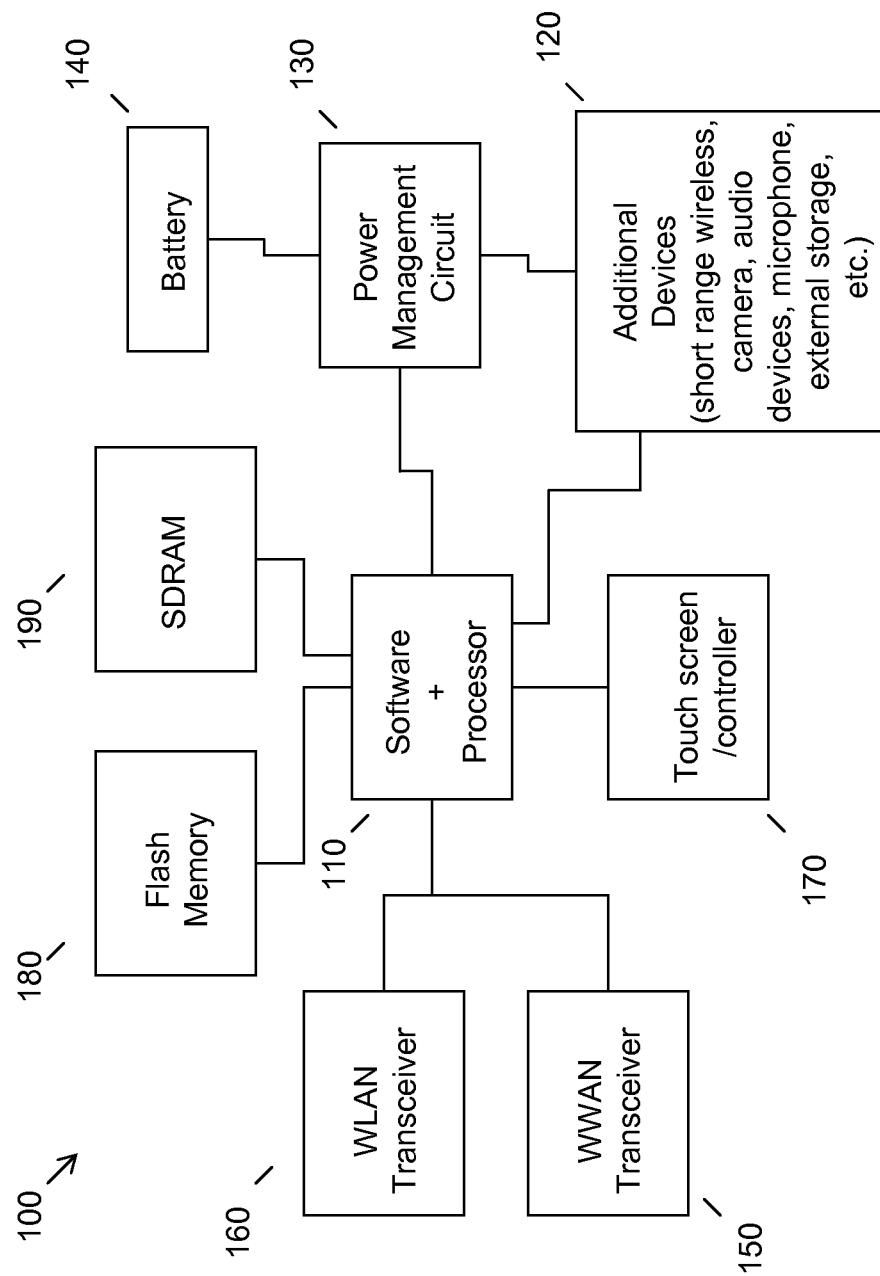
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Speech recognition technology is popular and used in connection with a variety of applications. For example, many device applications, e.g., Internet searching applications, word processing applications, communication applications (chat, email, SMS text, etc.) and the like may take voice input of the user, convert this voice input into a machine usable form (referred to herein as machine text—whether or not the voice signal is literally converted to text) for use by an application. For example, a user may provide a voice input command such as "stop web browser", with the web browser being a particular application currently running on the device.

Current speech recognition technology will faithfully and accurately identify this voice input. That is, conventional speech recognition will accurately determine that the user has literally spoken the words "stop web browser". However, acting on this voice input in a way the user intends is another matter entirely. That is, the voice input must be parsed and understood in order for the device to execute an appropriate action, e.g., closing the web browser, minimizing the web browser, etc.

As may be appreciated, it may be difficult to accurately map or associate a particular input string with a particular command. That is, a particular user might speak the words "stop web browser" in the hopes that the entire application is closed by the device, whereas another user might hope that the web browser is simply minimized, whereas another user may hope that the a currently loading web page is stopped, with the web browser staying on the current page, etc.

Added to this user-specific challenge is the fact that users may attempt to execute the same action, e.g., command to close a web browser, using different phrases. By way of example, a first user might speak the words "stop web browser" in an effort to have the device close the web browser, whereas a second user might speak the words "close the web browser" in an effort to close the web browser. Thus, the users might utilize different vocabulary (in this case, synonyms) in an effort to achieve the same goal.

Accordingly, an embodiment provides for user-specific learning of vocabulary such that a particular user's voice commands may be tailored to the appropriate actions (from the viewpoint of the particular user). Moreover, an embodiment provides for learning equivalent vocabulary such that different phrases (e.g., region phrases or slang words) may be utilized to execute the same command.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, one of the additional devices 120 is commonly a microphone, which may include physical elements that transforms sound waves into an electrical audio signal. Commonly, system 100 will include a touch screen 170 for data input and display/rendering. System 100 also typically includes various memory devices, for example flash memory 180 and SDRAM 190.

Figure 2:
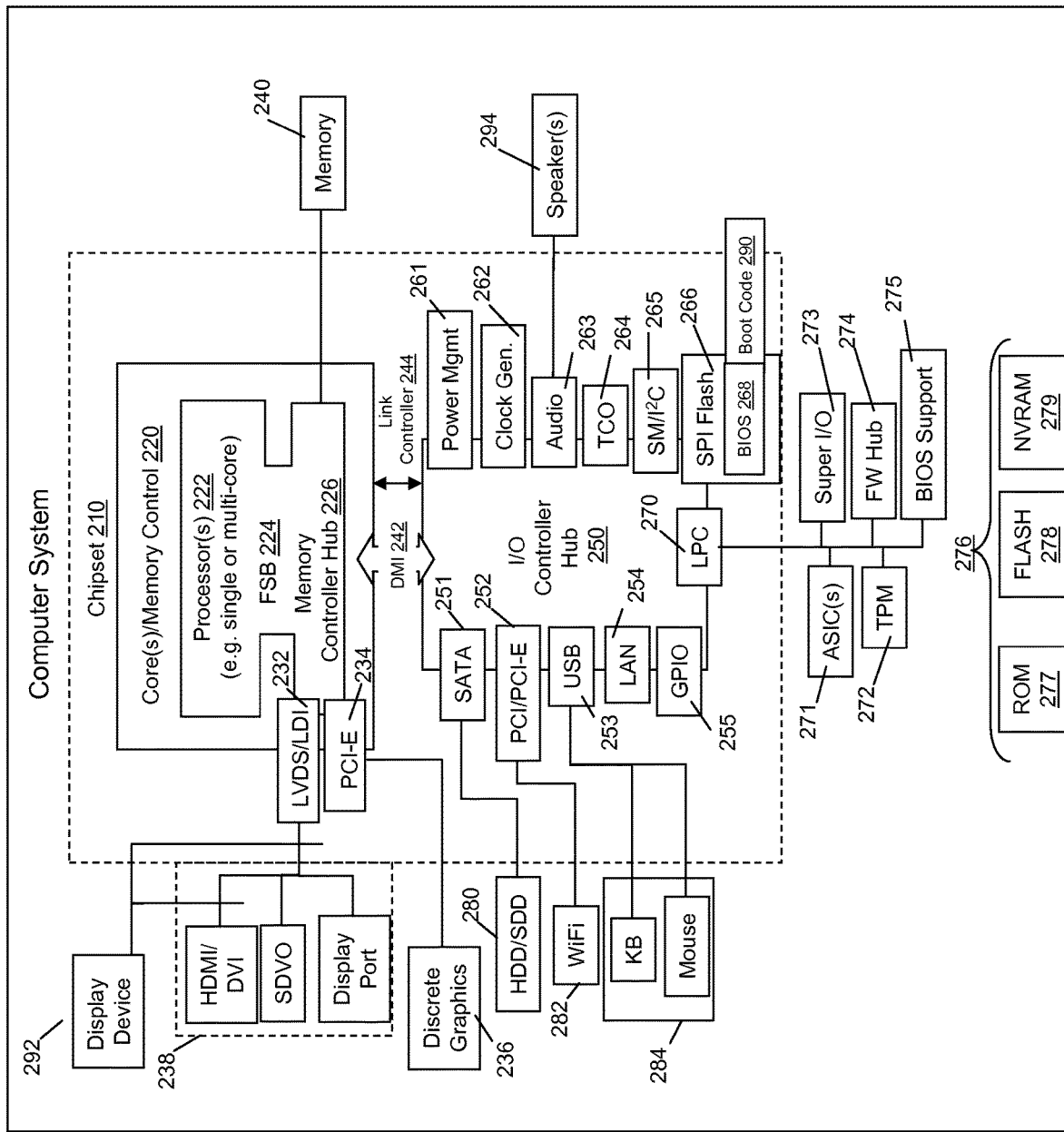
FIG. 2 illustrates another example of an information handling device.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices that allow users to provide voice inputs, e.g., using microphones of the respective devices, that in turn may be utilized by applications running on the devices. In this respect, the device circuitry outlined in FIG. 1 and FIG. 2 may include, e.g., in device memory, speech recognition technology that identifies the word (or words) spoken by the user for use as input to commit actions (e.g., form machine text input; execute a command to control an application, etc.).

Figure 3:
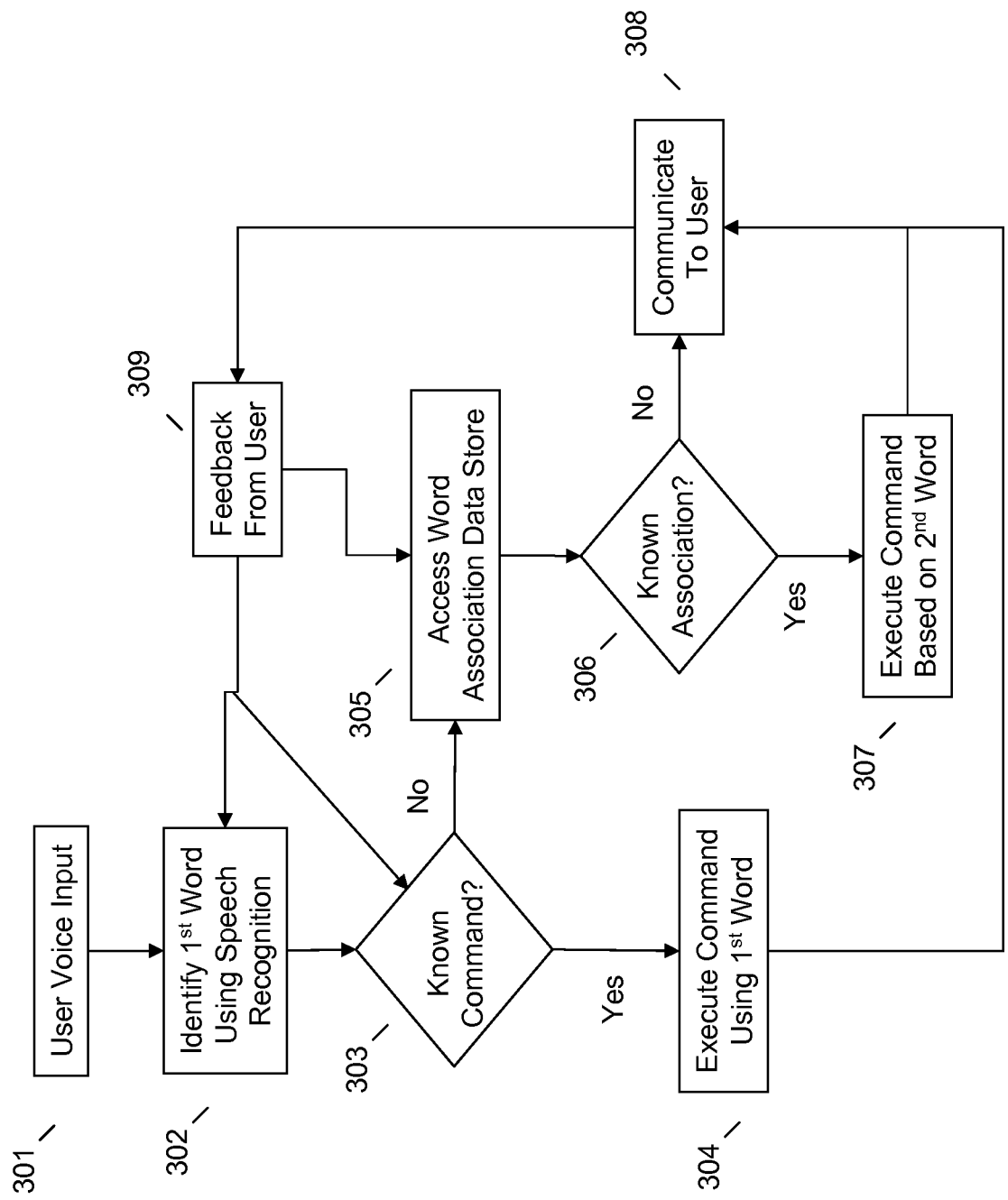
FIG. 3 illustrates an example method of adaptively learning vocabulary for completing speech recognition commands.

FIG. 3 outlines an example method of adaptively learning vocabulary for completing speech recognition commands. In an embodiment, a user may provide voice input at 301, e.g., as detected by an audio receiver of a device such as outlined in FIG. 1 and/or FIG. 2. This audio information is utilized by a speech recognition engine to identify the word(s) contained in the voice input. For example, a first interpretation of the voice input is made, e.g., according to a conventional speech recognition process. This is referred to herein as a "first word", i.e., the first word(s) identified for what the user actually said.

As a non-limiting example, the user may have a web browser open and wish to close the application. The user may voice the input "close web browser" as voice input at 301. The speech recognition may accurately identify the voice input as the machine text "close", "web" and "browser" as the $1^{st}$ word at 302. However, it must be determined if this input is associated with a known command. That is, "close" must be parsed, recognized as a command, and mapped to an action.

Therefore, an embodiment may determine if the command word is known at 303. In this example, the command "close" may be mapped to a default action, e.g., literally close the application identified (i.e., the web browser in this case). Thus, if a known command is identified, an embodiment may execute the known command based on or using the $1^{st}$ word interpretation at 304 and, in this example, closing the web browser.

However, it may happen that the "known" command, i.e., the default or otherwise identified command, is not what the particular user intended. Accordingly, an embodiment may communicate to the user at 308 to collect feedback (positive or negative) at 309 regarding the command executed. Thus, if the user had instead wished to simply minimize the web browser, not close it, the user may provide negative feedback at 309, e.g., in the form of indicating the command executed was wrong (at least for this particular user), the appropriate command to be executed, e.g., minimization, etc. This feedback provided at 309 may be utilized to more accurately identify the word recognition itself, the command mapping (as in the above example), and/or the association of various words with one another, as further described herein.

Accordingly, an embodiment may adaptively learn user-specific vocabulary in terms of the commands to be executed given a particular word's identification. This user-specific learning may be shared, e.g., via updating a shared data store regarding the interpretations of various words, such that other users (and their systems) may make use of these learned commands, e.g., via cloud shared access to a data store containing various associations. The user-specific learned commands may thus be accessed by the same user, e.g., based on the user identifying himself or herself to the device being utilized, such that that device currently being utilized may access the shared data store. Likewise, these learned commands may be stored locally on the device itself for later retrieval and use on the same device.

Given that an embodiment may learn new commands for a given voice input, e.g., "close web browser", when the user thereafter provides this input, it may result in a different command being committed or executed. For example, if the user thereafter voices the command "close web browser" (e.g., for the second time or for the first time if the device is apprised that this particular user's or other like users may have ambiguous intentions regarding the command word "close"), an embodiment will not determine at 303 that the command "close" is known. Rather, an embodiment may access a data store of word associations at 305, e.g., as previously learned and stored on the device or retrieved, e.g., from a cloud storage location.

Given the information in the word association data store, e.g., "closed" for this particular user may be known as an equivalent to "minimize". An embodiment may confirm this understanding, e.g., via communicating the action to be committed to the user for confirmation or including it in a list of possible commands (e.g., close the web browser, minimize the web browser, etc.). An embodiment may therefore determine there is a known association for the $1^{st}$ word interpretation at 306. Given this learned vocabulary, i.e., in the context of using "close" as a command, this particular user means specifically "minimize", an embodiment may execute a different action based on the $2^{nd}$ word, i.e., minimize in this example. Thus, an embodiment may convert the word "close" to "minimize", e.g., convert the first word to an equivalent, e.g., a second word, and base a command on the second word. As such, the web browser application may instead be minimized but not closed at 307. Again, an embodiment may continue to learn by communicating to the user at 308 and receiving feedback at 309.

An embodiment may learn words, e.g., verbs used to execute commands, in a wide variety of scenarios using this adaptive learning mechanism. As above, group learning may be employed, either alone or in combination with user-specific learning.

For example, a certain word or word(s) may have no known meaning to a device initially (either based on a local store of associations or access to remote stores of associations) but may thereafter obtain a meaning. An example is "unfriend", which was recently (circa 2009) added to the lexicon of English words. Thus, a new word, while originally being unknown, e.g., as determined at 303, may be learned by receiving user feedback at 309 such that it may be added to a particular user's vocabulary of actionable commands, a particular group's vocabulary of actionable commands, etc. Thus, an embodiment may learn new word, e.g., via accessing a shared data store that has been updated with a new word and/or a new meaning for a word. Additionally or in the alternative, a user specific new word or new word meaning may be input by a user and thereafter communicated to a shared data store such that other users having access thereto may employ the word or word meaning.

An embodiment may disambiguate words in a wide variety of contexts utilizing this adaptive learning mechanism. For example, in a particular region, a given word may have an accepted meaning, whereas in a different region, this same word may have no meaning or a different meaning.

As a specific example, an embodiment may learn from a user that the words "red up" in a particular geographic area has the meaning of "clean up" or "organize" Thus, faced with this input at 301, while the speech recognition engine may accurately determine that the user has voiced the phrase "red up" at 302, this phrase nonetheless is not initially mapped to or associated with a default known command at 303. Therefore, an embodiment may access a word association data store at 305 (e.g., user specific, regional specific, group specific, etc.) to determine that the phrase "red up" is a colloquialism utilized in Pennsylvania for "clean up" or "organize" Thus, at 306, an embodiment may determine there is a known association for such a command and execute a corresponding action at 307. For example, a user providing the voice input "red up" may have a corresponding formal language or standardized command word, e.g., organize or clean, associated with the colloquial word, and thus an embodiment may interpret this word as a clean up or organize command.

Accordingly the various embodiments may adapt the vocabulary used in the processing of voice commands. This adaptive learning my include user-specific learning, e.g., ascertained via user feedback mechanisms, and may also include group specific learning inasmuch as groups of users may share their vocabularies of words and/or commands. Additionally, various known variances in word usage may be taken into account, e.g., variations, as for example captured in stock word association data stores made accessible to the devices. Thus, the word association data store may include associations such as colloquialisms associated with formal language equivalents, slang terms associated with formal language terms, jargon terms associated with formal language terms, and dialect specific terms associated with formal language terms. Multiple national languages may be included in such data stores. Moreover, by sharing the data stores and associations made therein, different users may supplement their own locally stored vocabularies and associated commands.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, via an audio receiver of an information handling device, user voice input from a user;
   accessing, using a processor, a user profile associated with the user;
   identifying, using a processor, a first word from the user voice input, wherein the first word demands performance of an original action or a user-specific action, wherein the original action performs a different command than the user-specific action;
   accessing, using the processor, a word association data store associated with the user profile;
   determining, in the word association data store, whether feedback input adjusting the original action to the user-specific action for the first word was previously received, wherein the feedback input does not adjust an identification of the first word; and
   performing, responsive to determining that the feedback input was previously received, the user-specific action.

2. The method of claim 1, wherein the feedback input corresponds to negative feedback input.

3. The method of claim 1, wherein the word associations within the word association data store are word associations selected from the group of associations consisting of colloquialisms associated with formal language equivalents, slang terms associated with formal language terms, jargon terms associated with formal language terms, and dialect specific terms associated with formal language terms.

4. The method of claim 1, wherein the word association data store includes formal language equivalents for a plurality of formal languages.

5. The method of claim 1, further comprising providing a communication to the user prior to executing the user-specific action.

6. The method of claim 5, wherein the communication queries the user for confirmation.

7. The method of claim 1, wherein the feedback input was previously received from a group of associated users.

8. The method of claim 7, wherein the group of associated users comprises users associated via a cloud account linkage.

9. An information handling device, comprising:
an audio receiver;
a processor; and
a memory device that stores instructions executable by the processor to:
receive, via the audio receiver, user voice input from a user;
access a user profile associated with the user;
identify, using the processor, a first word from the user voice input, wherein the first word demands performance of an original action or a user-specific action, wherein the original action performs a different command than the user-specific action;
access, using the processor, a word association data store associated with the user profile;
determine, in the word association data store, whether feedback input adjusting the original action to the user-specific action for the first word was previously received, wherein the feedback input does not adjust an identification of the first word; and
perform, responsive to determining that the feedback input was previously received, the user-specific action.

10. The information handling device of claim 9, wherein the feedback input corresponds to negative feedback input.

11. The information handling device of claim 9, wherein the word associations within the word association data store are word associations selected from the group of associations consisting of colloquialisms associated with formal language equivalents, slang terms associated with formal language terms, jargon terms associated with formal language terms, and dialect specific terms associated with formal language terms.

12. The information handling device of claim 9, wherein the word association data store includes formal language equivalents for a plurality of formal languages.

13. The information handling device of claim 9, wherein the instructions are further executable by the processor to provide a communication to the user prior to executing the user-specific action.

14. The information handling device of claim 13, wherein the communication queries the user for confirmation.

15. The information handling device of claim 13, wherein the communication comprises a list of suggested commands to be executed.

16. The information handling device of claim 1, wherein the feedback input was previously received from a group of associated users.

17. A product, comprising:
a storage device having code stored therewith, the code comprising:
code that receives, via an audio receiver of an information handling device, user voice input from a user;
code that access a user profile associated with the user;
code that identifies a first word from the user voice input, wherein the first word demands performance of an original action or a user-specific action, wherein the original action performs a different command than the user-specific action;
code that accesses a word association data store associated with the user profile;
code that determines, in the word association data store, whether feedback input adjusting the original action to the user-specific action for the first word was previously received, wherein the feedback input does not adjust an identification of the first word; and
code that performs, responsive to determining that the feedback input was previously received, the user-specific action.

* * * * *